(12) United States Patent
Tanaka

(10) Patent No.: US 7,410,290 B2
(45) Date of Patent: Aug. 12, 2008

(54) EAR-TYPE CLINICAL THERMOMETER

(75) Inventor: Hideki Tanaka, Chuo-ku, Sapporo (JP)

(73) Assignee: Kabushiki Kaisha Bio Echo Net, Chuo-Ku, Sapporo (JP)

(*) Notice: Subject to any disclaimer, the term of this patent is extended or adjusted under 35 U.S.C. 154(b) by 30 days.

(21) Appl. No.: 11/375,554

(22) Filed: Mar. 13, 2006

(65) Prior Publication Data
US 2006/0239329 A1 Oct. 26, 2006

(30) Foreign Application Priority Data
Mar. 14, 2005 (JP) .............................. 2005-071350

(51) Int. Cl.
*A61B 5/00* (2006.01)
*G01J 5/20* (2006.01)
(52) U.S. Cl. ........................ 374/121; 374/185; 374/208; 600/549
(58) Field of Classification Search ................. 374/183, 374/185, 163, 120, 121, 132, 208; 600/549, 600/474; 702/136
See application file for complete search history.

(56) References Cited

U.S. PATENT DOCUMENTS

| | | | | |
|---|---|---|---|---|
| 2,925,572 | A * | 2/1960 | Boddy | ........................ 338/28 |
| 3,581,570 | A * | 6/1971 | Wortz | ........................ 600/549 |
| 3,626,757 | A * | 12/1971 | Benzinger | .................... 600/549 |
| 4,603,026 | A * | 7/1986 | Martin | ................... 264/272.18 |
| 4,729,672 | A * | 3/1988 | Takagi | ........................ 374/208 |
| 4,781,469 | A * | 11/1988 | Turon-Lagot | ................. 374/27 |
| 4,854,730 | A * | 8/1989 | Fraden | ........................ 374/164 |
| 4,934,831 | A * | 6/1990 | Volbrecht | .................... 374/183 |
| RE34,789 | E * | 11/1994 | Fraden | ........................ 702/104 |

(Continued)

FOREIGN PATENT DOCUMENTS

JP 58190734 A * 11/1983

(Continued)

OTHER PUBLICATIONS

"Our Technology", Article published on Website of Ishizuka Electronics Corporation (and translation thereof), from the feature article named "High technology of sensor" in Dempa-Shimbum on May 12, 2005.

*Primary Examiner*—Gail Verbitsky
(74) *Attorney, Agent, or Firm*—DeLio & Peterson, LLC

(57) ABSTRACT

A probe of an ear-type clinical thermometer 20 comprises a first heat insulation member 210 made of a resin material and a second high heat insulation member 220 made of a resin material that is connected to a distal end of the first heat insulation member 210 by conventional coupling means. The second high heat insulation member 220 is tapered forwardly and is provided on the distal end with a concave surface 221. A protection cover 230 sheathes the first heat insulation member 210 and second high heat insulation member 220. A thermistor fine lead wire 240 is embedded in the first heat insulation member 210 and second high heat insulation member 220 so that a turning end portion 241 of the wire 240 is bridged over the concave surface 221 of the second high heat insulation member 220 to be exposed above the concave surface 221. An ultrafast responsivity thermistor 250 is mounted substantially on a center of the turning end portion 241 of the thermistor fine lead wire 240.

6 Claims, 8 Drawing Sheets

U.S. PATENT DOCUMENTS

| | | |
|---|---|---|
| 6,059,452 A | 5/2000 | Smith et al. |
| 6,886,978 B2 * | 5/2005 | Tokita et al. ................. 374/169 |
| 2002/0067243 A1 * | 6/2002 | Noli ............................ 338/25 |
| 2004/0013162 A1 | 1/2004 | Beerwerth et al. |
| 2004/0141545 A1 * | 7/2004 | Hoshisashi et al. .......... 374/208 |
| 2005/0094707 A1 * | 5/2005 | Lee et al. ..................... 374/163 |
| 2005/0117626 A1 * | 6/2005 | Kobayashi et al. .......... 374/163 |
| 2006/0013282 A1 * | 1/2006 | Hanzawa et al. ............ 374/163 |
| 2007/0091980 A1 * | 4/2007 | Tanaka ........................ 374/121 |
| 2007/0211783 A1 * | 9/2007 | Huang et al. ................ 374/121 |

FOREIGN PATENT DOCUMENTS

| | | |
|---|---|---|
| JP | 03-221820 | 9/1991 |
| JP | 07-005047 | 1/1995 |
| JP | 08-320-257 | 12/1996 |
| JP | 11-160146 | 6/1999 |

* cited by examiner

EAR-TYPE CLINICAL THERMOMETER

BACKGROUND OF THE INVENTION

This invention generally relates to a thermometer that measures a temperature of an object to be measured in a noncontact manner and more particularly relates to a clinical thermometer that measures a temperature of an eardrum by inserting an end of a probe into an ear.

For convenience of explanation, a typical conventional ear-type clinical thermometer will be described below by referring to FIGS. 8 and 9. FIG. 8 is a schematic block diagram of a conventional ear-type clinical temperature, illustrating a principle of operation. FIG. 9 is a longitudinal section view of an end portion of a probe in a typical conventional ear-type clinical thermometer. As shown in FIGS. 8 and 9, a probe 10 of a typical conventional ear-type clinical thermometer utilizes a thermopile 11. In general, a thermopile creates an electric potential difference (Seebeck effect) by a difference of temperature between a cold junction and a hot junction on the thermopile. In order to utilize the thermopile as a probe for measuring a temperature, it is necessary to effect a compensation of a room temperature (an environmental temperature), as is the case with a thermocouple. Thus, the conventional ear-type clinical thermometer has used a thermistor 12.

When a temperature in an object being measured is equal to a temperature in a cold junction on the thermopile 11, an output from the probe 10 is zero (zero point). On the other hand, when a temperature in an object being measured is higher than a temperature in a cold junction on the thermopile 11, an output from the probe 10 becomes great nonlinearly.

In the case where the probe 10 measures a body temperature, an output from the probe 10 is a very feeble level. Consequently, it is necessary for a signal amplifier 13 to amplify the output from the probe 10 to a level to which a signal processing can be applied. Further, it is necessary for a linearizer 14a to linearize the nonlinear output. On the other hand, since an output from the thermistor 12 is nonlinear, a linearizer 14b must linearize the output from the thermistor 12.

Under a stable condition of an environmental temperature, a temperature in the thermistor 12 is equal to a temperature in a cold junction on the thermopile 11. A signal linearized from the output of the probe 10 indicates a difference between the temperatures in the thermistor 12 and in the object being measured. Accordingly, it is possible to obtain the temperature of the object being measured by correcting the environmental temperature by a temperature conversion device 17 after correcting the signal linearized from the output of the probe 10 by an emittance correction device 15 and effecting a compensation of room temperature or a compensation of cold junction temperature of the corrected signal and the linearized signal from the thermistor 12 by an adding device 16. This will be displayed on a display 18.

Since the thermopile has an unstable sensitivity in individual differences, the output voltage is unstable, even if there is a certain difference of temperature. Thus, it is necessary to individually effect an adjustment of sensitivity (correcting operation) for a probe using a thermopile. Although an infrared absorption membrane for the thermopile (a portion 116 integrated with the infrared absorption membrane and hot junction in FIG. 9) increases a temperature by absorption of infrared rays, a package of the thermopile also radiates infrared rays onto the infrared absorption membrane. In a common using method, the package is deemed to be at the same as the temperature of a heat sink (heat absorption section) in the thermopile. However, when the package is subject to an abrupt change of temperature due to an external factor, a difference of temperature will be caused between a head portion of the package and the heat sink of the thermopile and the probe will output an unstable voltage transiently.

Consequently, in order to apply a uniform and moderate change of temperature to the probe 10, as shown in FIG. 9, a thermopile 110 is disposed in a holder 111 made of a metal having a good heat conduction (for example, aluminium) and the holder 111 is sheathed by a cover 114 so as to enclose the thermopile 110 by an air layer 112 and a resin 113 that serve as an heat insulation material. A metal tube 115 is provided on a front side of the thermopile 110 to reduce affection of heat radiation from the object being measured (human body). The metal tube 115 is plated with gold to reduce an emittance as low as possible and to serve as a wave-guide. Although a semiconductor, a thermistor, or the like is usually utilized as a sensor for compensating a temperature of the cold junction, the thermistor has been commonly used on account of a low cost in production and a high precision.

In the case where a heat coupling between the cold junction on the thermopile and the thermistor is poor, a difference of temperature is caused and it is impossible to effect a precise measurement. A thermistor (not shown) is mounted in a package together with the thermopile to enhance a heat coupling between a heat sink of the thermopile cold junction and the thermistor. Since a B constant (resistant temperature characteristics, that is, a constant for indicating a change of a resistant value obtained from temperatures at any two points) is unstable even if any thermistors have the same standard, it is difficult to maintain a precision within a wide range of environmental temperature. For example, in the case where a thermistor in an electronic clinical thermometer measures a body temperature within a range of 34 to 42° C., a precision of the thermistor may be maintained within a range of 8° C. However, in the case where a range of environmental temperature in the thermopile is set to be within a range of 5 to 40° C., a precision of the thermistor must be maintained within a range of 35° C. (40−5=35).

A structure of the probe 10 shown in FIG. 9 causes a difference of temperature between the thermopile 110 and a distal end of the probe 10 during increase of the environmental temperature. The probe 10 will generate a positive error, since a temperature at the distal end of the probe 10 is higher than that of the thermopile 110. The probe 10 causes a difference of temperature between the thermopile 110 and the distal end of the probe 10 during decrease of the environmental temperature. The probe 10 will generate a negative error, since a temperature at the distal end of the probe 10 is lower than that of the thermopile 110. In order to reduce such errors, the cover 114 encloses the thermopile 110 to lower affection of a temperature change. However, an oversize of the metal holder 111 is limited on account of the object being measured. A countermeasure against the errors due to the change of environmental temperature takes a correction of an output of the probe by calculating a rate of change per time concerning the thermistor in the thermopile package, thereby reducing the errors.

A first object of the present invention is to provide an ear-type clinical thermometer that can eliminate affection due to a change of environmental temperature during a short period of time and does not generate an error due to a change of environmental temperature.

A thermistor is used to compensate a temperature in a cold junction on a thermopile utilized in an infrared clinical thermometer. Although it is easy to adjust the characteristics of the thermistors in the limited range of temperatures, as is the case where the thermistor is used in an electro clinical thermometer, it will be difficult to adjust the characteristics in a wide range of temperatures in the case where the thermistor is used in a clinical thermometer. Accordingly, a second object of the present invention is to provide an ear-type clinical thermometer that can ensure a precision within a wide range of environmental temperature.

The thermopile requires a correcting operation to maintain a precision, since the thermopile has great individual differences. A correcting operation of the thermopile will invite a high cost in production. Accordingly, a third object of the present invention is to provide an ear-type clinical thermometer that can require no correcting operation or achieve a greatly simplified correction in comparison with a thermopile system.

When a conventional ear-type clinical thermometer measures a body temperature under a lower temperature environment, a probe of the thermometer will cool an external acoustic meatus. Although a precision of measurement at the first time will be considerably good, indications of measurement after a second time or later without taking much time are likely to be lower. Consequently, measured values in the conventional ear-type clinical thermometer will be unstable on account of affection of environmental temperatures. Accordingly, a fourth object of the present invention is to provide an ear-type clinical thermometer that can eliminate unstable indications due to affection of environmental temperature.

SUMMARY OF THE INVENTION

An ear-type clinical thermometer in accordance with the present invention including a probe comprising: a first heat insulation member made of a resin material; a second high heat insulation member made of a resin material that is connected to a distal end of the first heat insulation member; a protection cover that sheathes the first heat insulation member and second high heat insulation member; a thermistor fine lead wire embedded in the first heat insulation member and second high heat insulation member; and an ultrafast responsivity thermistor mounted substantially on a center of a turning end portion of the thermistor fine lead wire. The second high insulation member serves not to absorb a heat in an external acoustic meatus by the probe during measurement of a body temperature.

Preferably, the second high heat insulation member is tapered forwardly and is provided on the distal end with a concave surface. The turning end portion of the thermistor fine lead wire is bridged over the concave surface of the second high heat insulation member to be exposed above the concave surface. The concave surface of the second high heat insulation member is preferably worked by a mirror finish manner. The concave surface has an effect on reflecting infrared rays to the thermistor.

A heat time constant of the ultrafast responsivity thermistor is preferably 1 second or lower in order to shorten a period of time of measurement.

An analogue switch having a plurality of terminals is preferably provided at an output side of a power source circuit in a temperature measuring circuit in order to correct errors in the temperature measuring circuit.

According to the present invention, a range of temperature at which the thermistor can maintain a precision is only a range of a body temperature to be measured and it is not necessary to maintain a precision of the thermistor in a whole range of an environmental temperature to be measured, as is the case with a conventional ear-type clinical thermometer using the thermopile. Consequently, the probe of the present invention is not subject to affection of change of environmental temperature (change of temperature during a short period of time), that is, there is no so-called "roasting" phenomenon in the probe. The temperature measuring circuit in the ear-type clinical thermometer of the present invention can be further simplified than a conventional temperature measuring circuit using a thermopile. An assembling work of the ear-type clinical thermometer of the present invention can be facilitated upon a mass production and an external configuration of a clinical thermometer body is not limited, since the probe is a very small size.

BRIEF DESCRIPTION OF THE DRAWINGS

The features of the present invention believed to be novel and the element characteristic of the present invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DETAILED DESCRIPTION OF THE PREFERRED EMBODIMENTS

Figure 1:
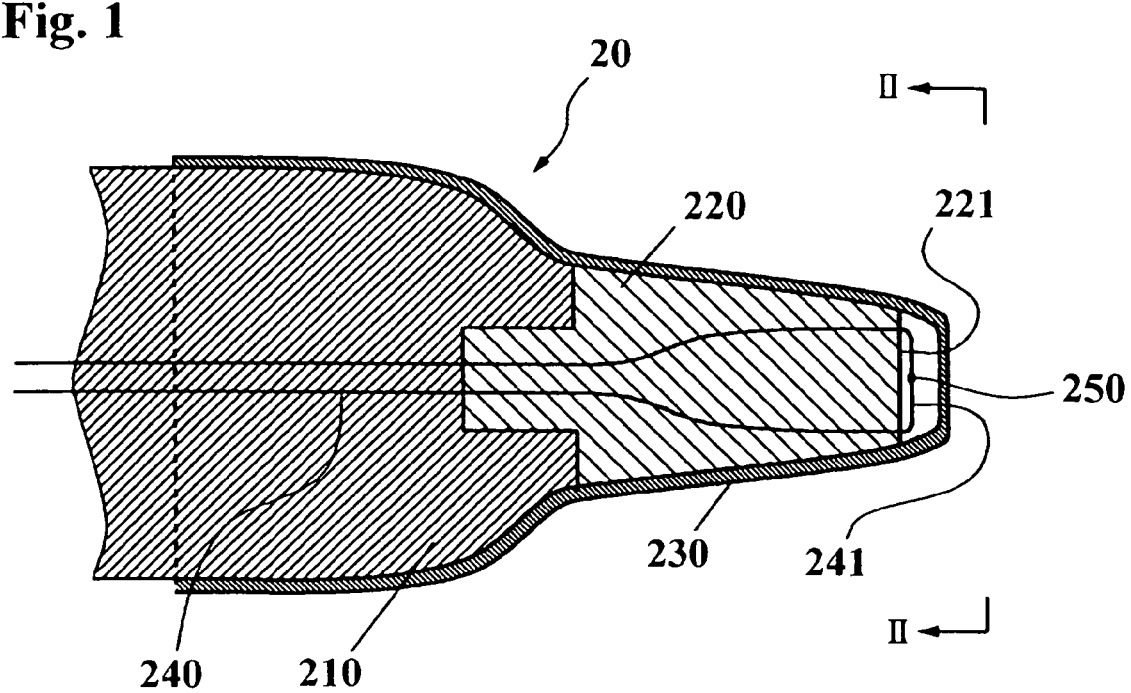
FIG. 1 is a longitudinal section view of an end portion of a probe in an ear-type clinical thermometer in accordance with the present invention.

In describing the preferred embodiment of the present invention, reference will be made herein to FIGS. 1 to 7 of the drawings in which like numerals refer to like features of the invention. Features of the invention are not necessarily shown to scale in the drawings.

Figure 2:
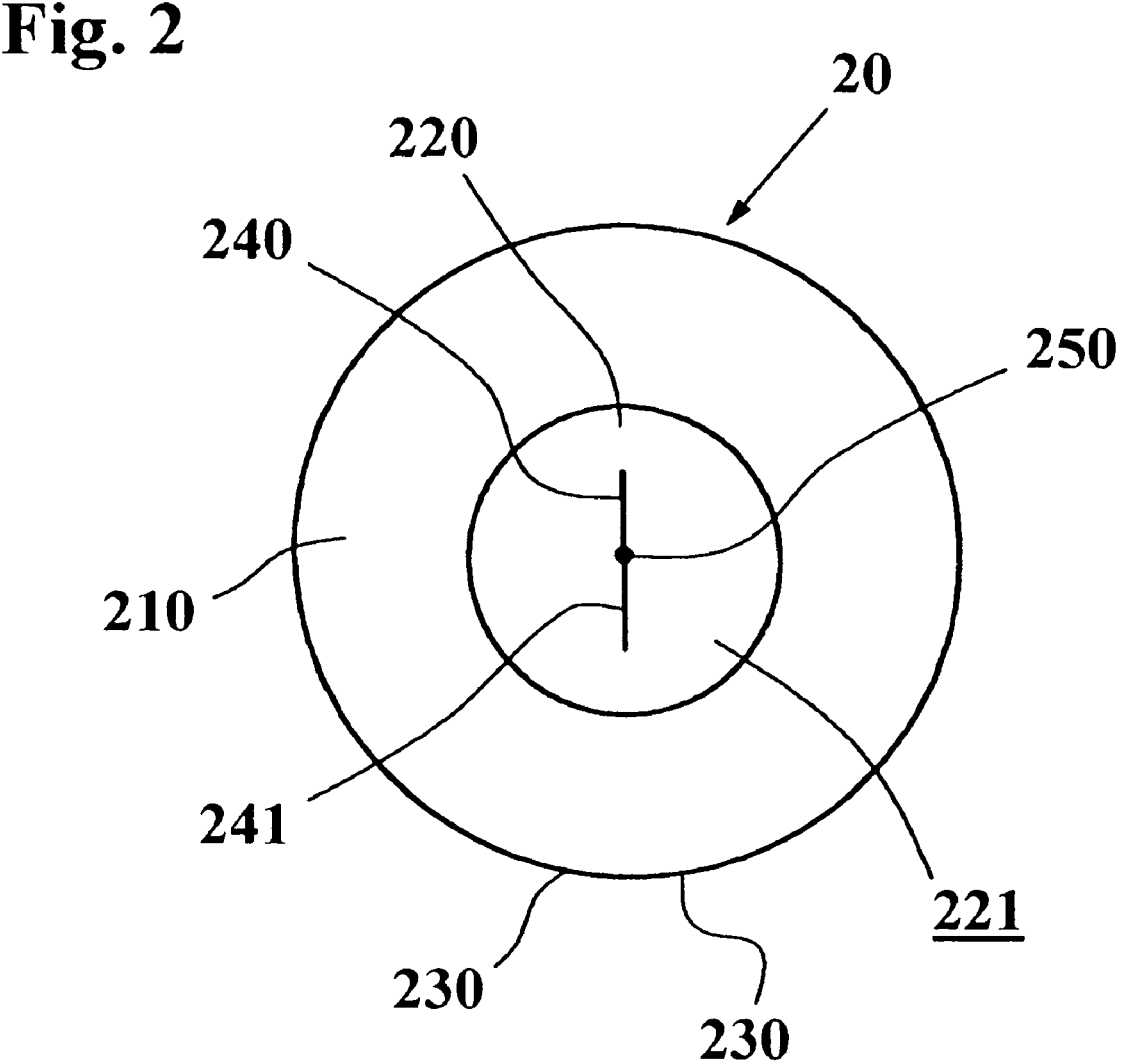
FIG. 2 is a front elevation view of the probe end portion taken along line II-II in FIG. 1.
Figure 8:
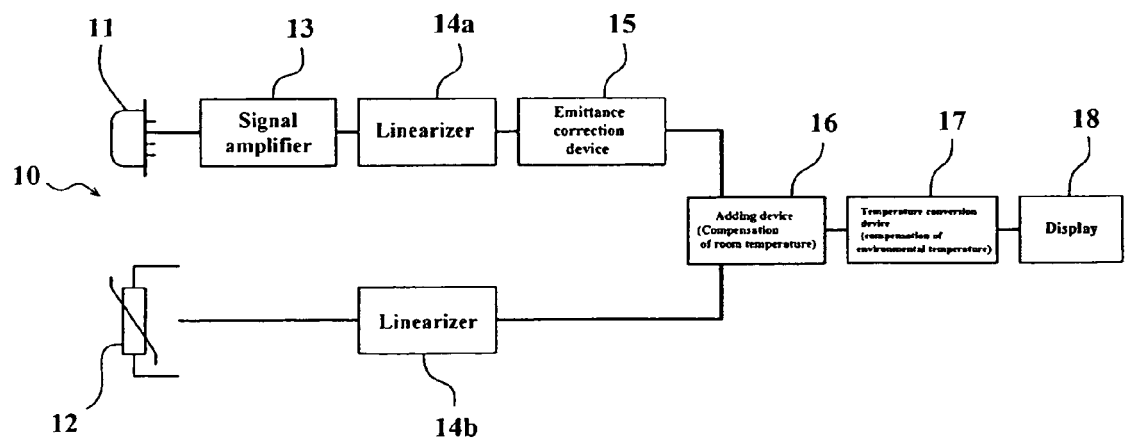
FIG. 8 is a schematic block diagram of a conventional ear-type clinical thermometer, illustrating a principle of operation of the thermometer.
Figure 9:
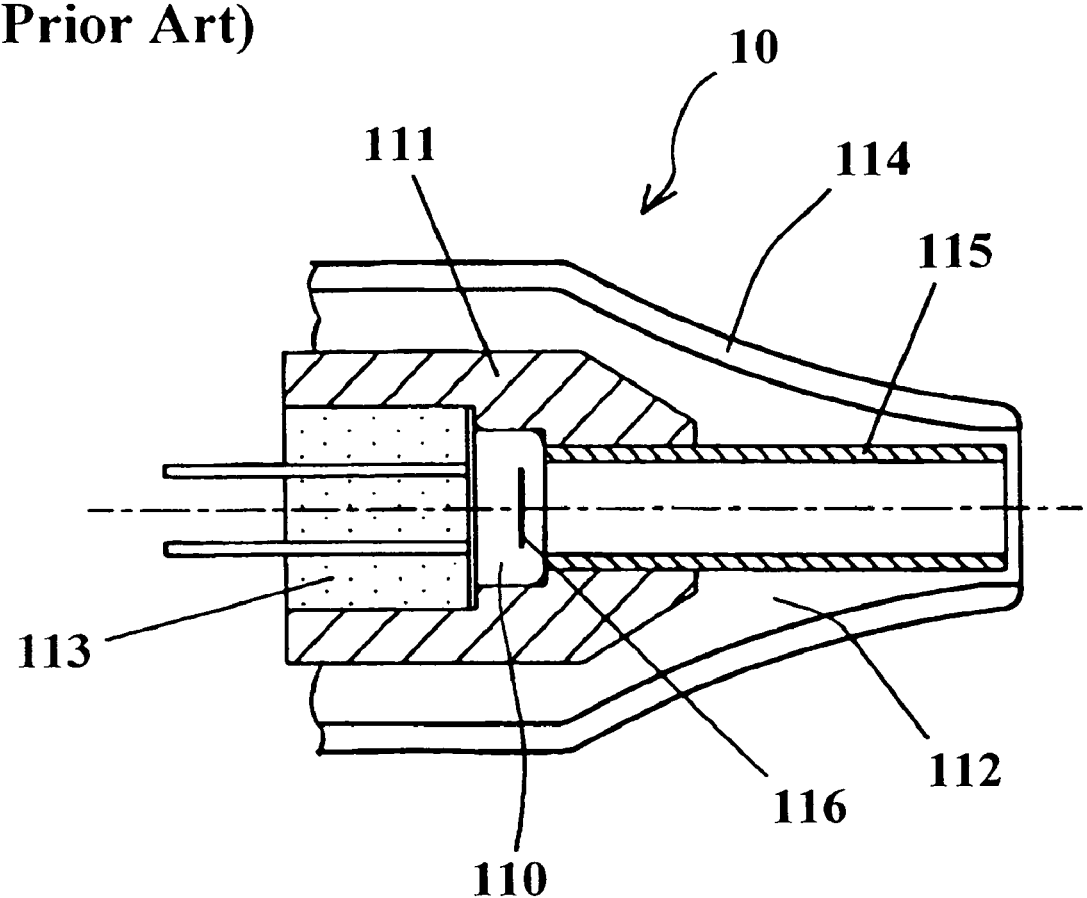
FIG. 9 is a longitudinal section view of an end portion of a probe in a conventional ear-type clinical thermometer.

Referring now to FIGS. 1 to 7, an embodiment of an ear-type clinical thermometer in accordance with the present invention will be explained below. FIGS. 1 and 2 show a structure of a probe 20 in an ear-type clinical thermometer in accordance with the present invention. In the probe 20, a second high heat insulation member 220 made of a resin material is connected to a distal end of a first heat insulation member 210 by conventional coupling means (for example, welding, adhesive, press-fitting, screw-coupling, or the like). The second high heat insulation member 220 is tapered forwardly from a portion coupled to the first heat insulation member 210 to an end surface 221. A protection cover 230 sheathes the first heat insulation member 210 and second high heat insulation member 220. A thermistor fine lead wire 240 is embedded in the first heat insulation member 210 and second high heat insulation member 220 so that a turning end portion 241 of the wire 240 is bridged over the surface 221 of the second high heat insulation member 220 to be exposed above the surface 221. An ultrafast responsivity thermistor 250 is mounted substantially on a center of the turning end portion 241 of the thermistor fine lead wire 240. Although a thermistor 12 (see FIG. 8) to be used in a conventional ear-type clinical thermometer has a diameter of 1 mm and a length of 2 to 3 mm, the thermistor 250 to be used in the ear-type clinical thermometer of the present invention is, for example, a cube having a side of 0.3 mm.

Figure 3:
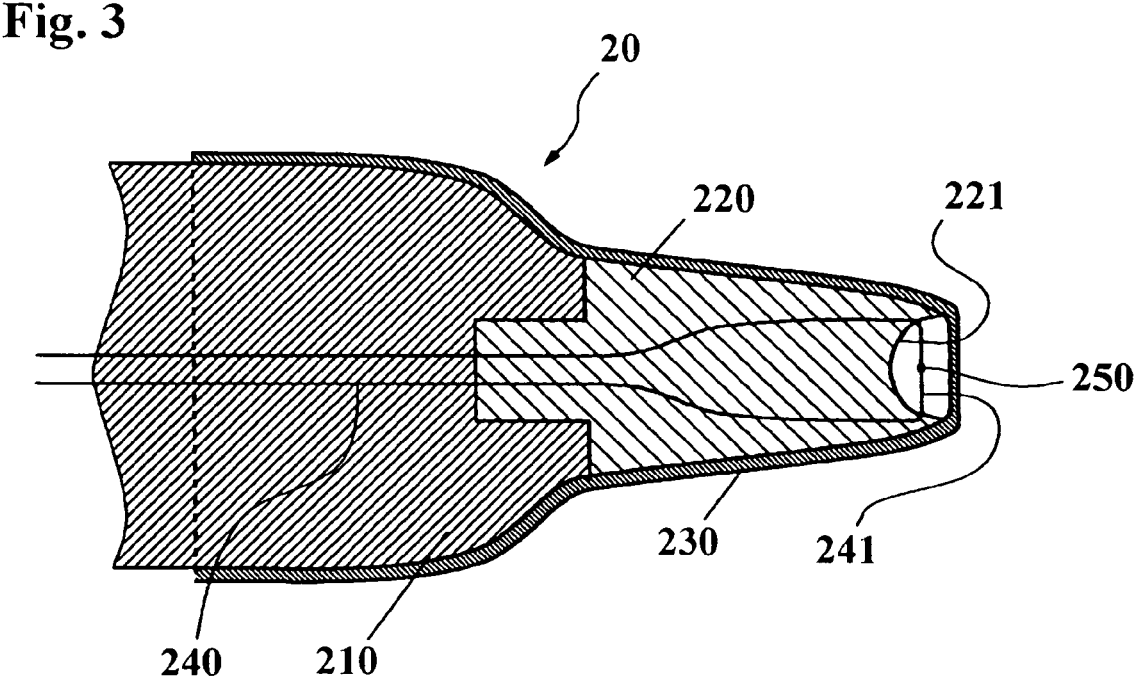
FIG. 3 is a sectional view similar to FIG. 1, illustrating an alteration of the probe end portion shown in FIG. 1.

Preferably, the surface 221 of the second high heat insulation member 220, as shown in FIG. 3, is formed into a concave configuration in order to enhance reflection effect of infrared rays onto the thermistor 250. It is possible to further enhance an efficiency of reflection by working the concave surface 221 by a mirror finish manner.

Figure 4:
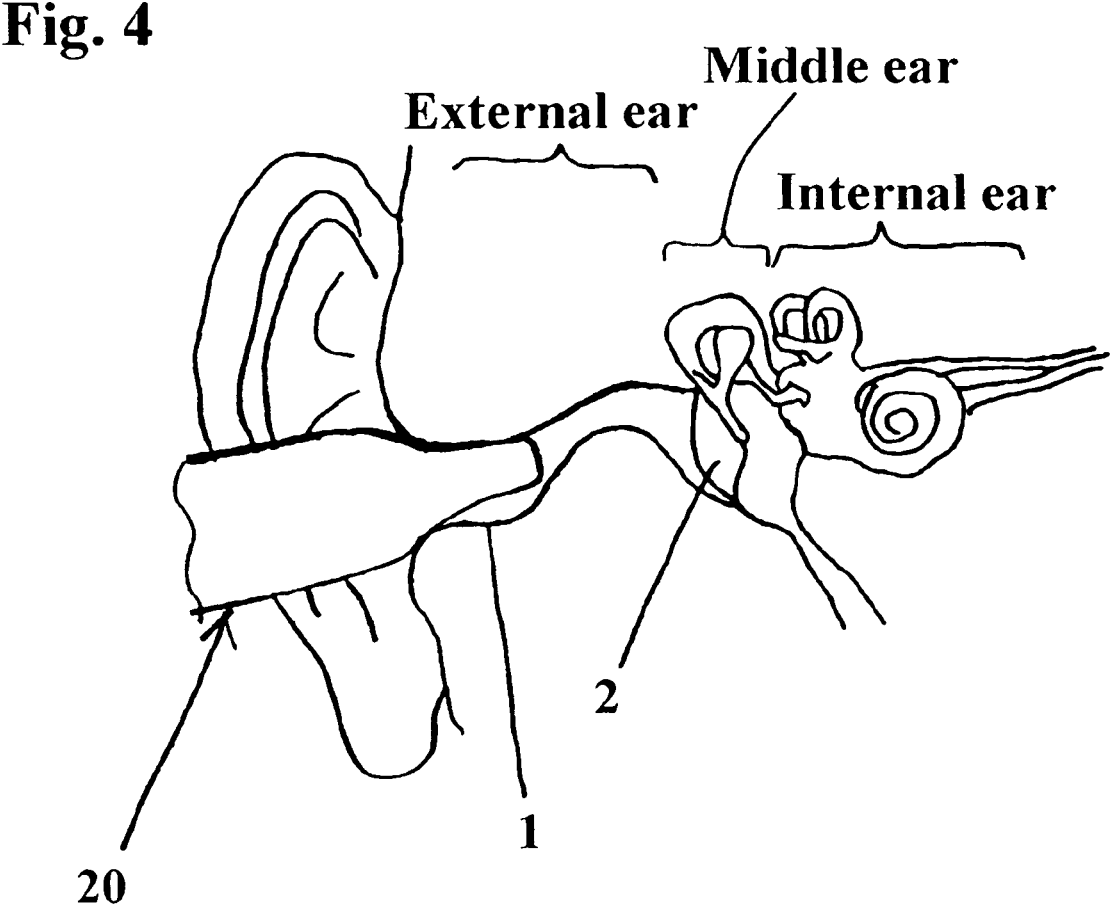
FIG. 4 is a schematic explanatory view in which the probe end portion of the ear-type clinical thermometer according to the present invention is inserted into the ear.

FIG. 4 shows a measuring position of the probe 20 in the ear-type clinical thermometer of the present invention when the probe 20 is inserted into an external acoustic meatus 1. An end of the probe 20 is preferably formed into a configuration in which an intermediate portion of the probe 20 closely contacts with an inlet of the external acoustic meatus 1 and a space between the distal end of the probe 20 and an eardrum 2 becomes as small as possible.

Factors that determine a temperature of the thermistor 250 includes an increase of temperature in the thermistor fine lead wire 240 and thermistor 250 due to a direct radiation of infrared rays, a direct heat conduction of air in the external acoustic meatus, and a direct heat conduction due to the probe 20 inserted into the external acoustic meatus. It is necessary that the distal end of the probe 20 does not affect a temperature in the external acoustic meatus 1 when the probe 20 is inserted into the external acoustic meatus 1. Thus, the second high heat insulation member 220 and protection cover 230 serve to reduce such affection.

Figure 5:
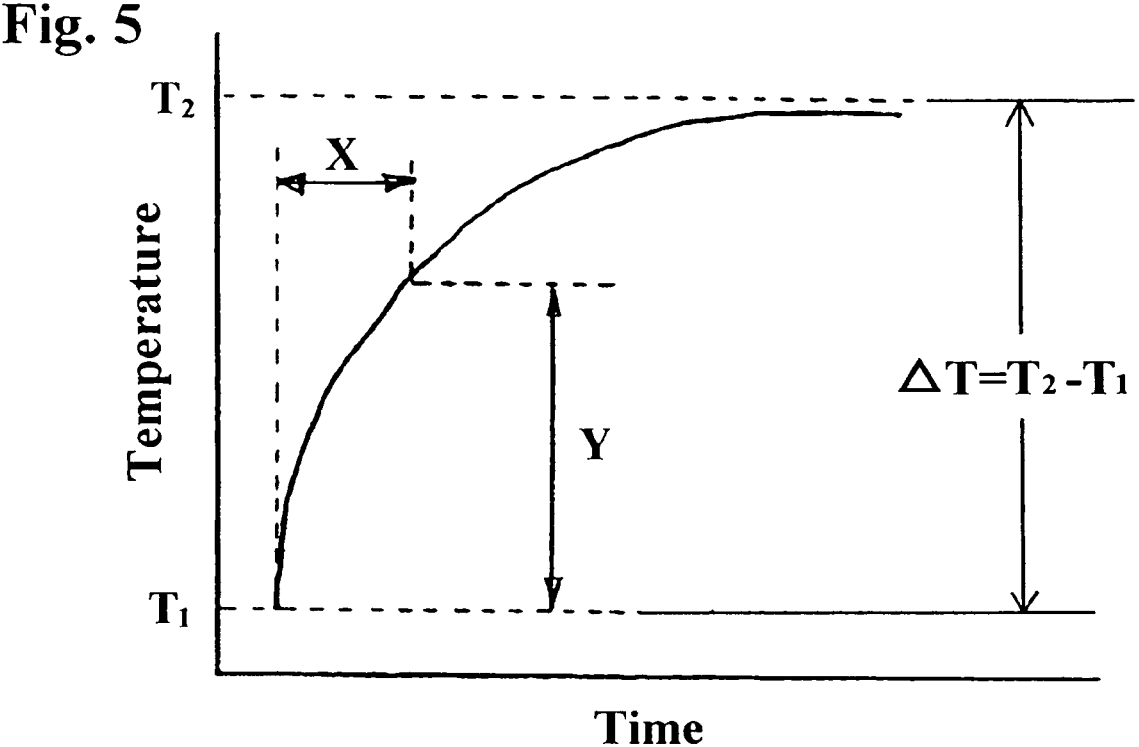
FIG. 5 is a graph illustrating a heat time constant of a thermistor.

FIG. 5 is an explanatory view that defines a heat time constant. The heat time constant means a period of time in which when the thermistor 250 kept at any temperature $T_1$ is suddenly inserted into an environment at an ambient temperature $T_2$, the thermistor 250 is changed from the temperature $T_1$ to the target temperature $T_2$. Generally, the heat time constant is a period of time X that reaches 63.2% (Y) of a difference of temperature $\Delta T$ between temperatures $T_1$ and $T_2$ ($\Delta T = T_2 - T_1$). The thermistor 250 to be used in the present invention is an ultrafast responsivity thermistor having a heat time constant of 1 second or lower (preferably, 0.1 second or lower) in the air.

Figure 6:
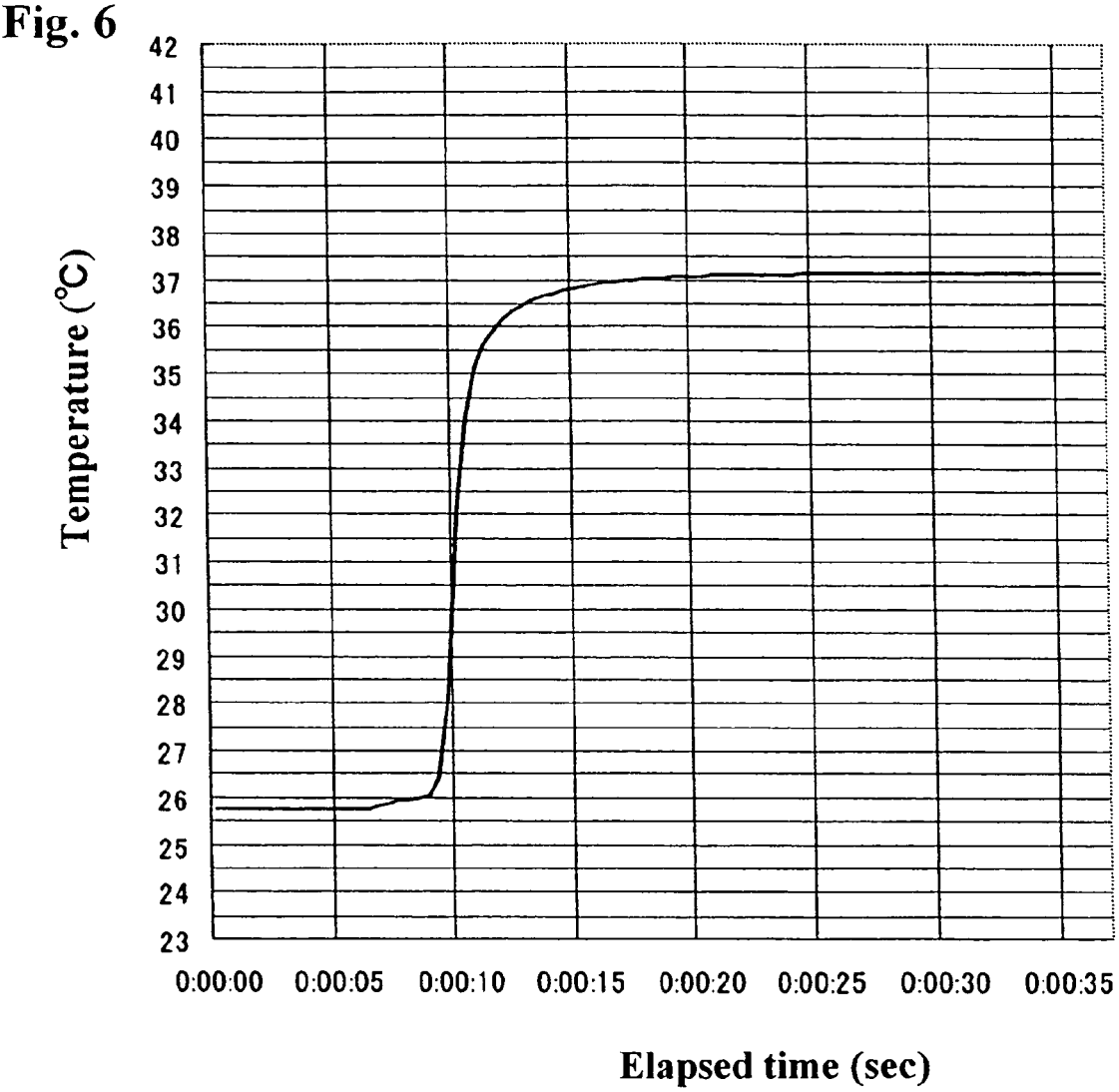
FIG. 6 is a graph that illustrates results of body temperatures measured by the ear-type clinical thermometer according to the present invention.
Figure 7:
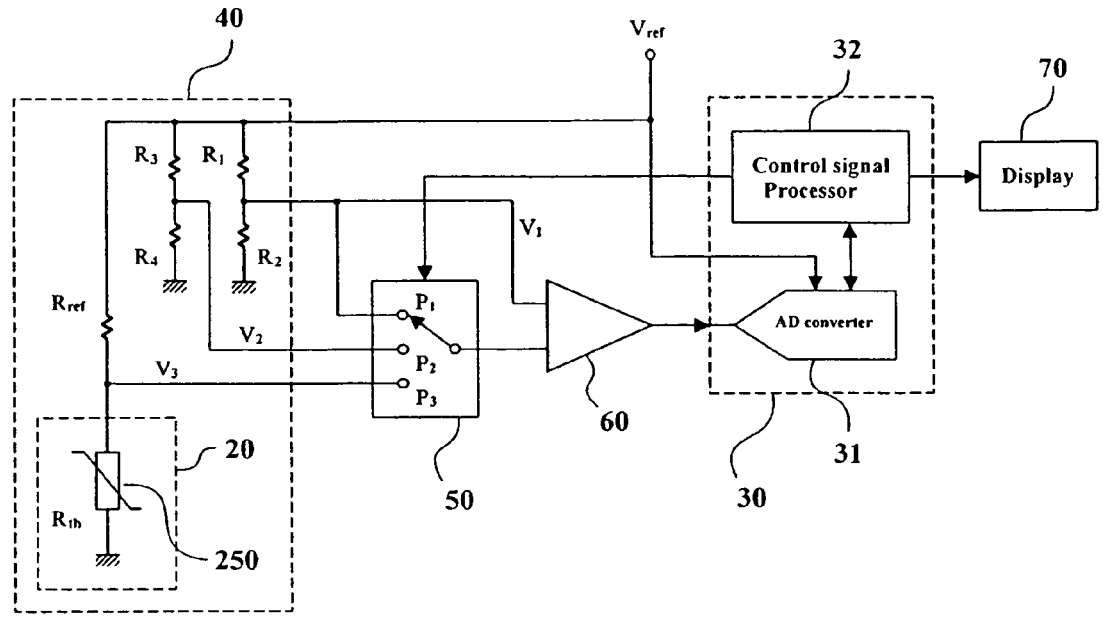
FIG. 7 is a block diagram of a temperature measuring circuit in the ear-type clinical thermometer according to the present invention.

FIG. 6 is a graph that illustrates a change of temperature in a thermistor when the probe 20 shown in FIG. 1 or 2 measures body temperatures. In FIG. 6, an axis of ordinate indicates a temperature (° C.) while an axis of abscissa indicates an elapsed time (second). At this time, the heat time constant of the thermistor mounted on the probe 20 is 1 (one) second and a period of time for measuring a temperature is within 10 (ten) seconds. In order to measure a temperature in a short period of time, it is preferable that the heat time constant of the thermistor 250 in the air is about 0.1 second. Thus, this can shorten a measuring time by 1 to 2 seconds.

Since a V-F converting system that has been used generally in a conventional electronic clinical thermometer takes much time for measuring though it has a high precision, it is impossible to take advantage of a high responsive speed of the probe 20 by utilizing the V-F converting system. Accordingly, the ear-type clinical thermometer of the present invention adopts a temperature measuring circuit system, for example, a system shown in FIG. 7. This temperature measuring circuit system utilizes a microcontroller unit (MCU) 30 containing an AD converter 31 and a control signal processor 32. The MCU containing the AD converter has become widely available and in particular, the MCU containing the AD converter within ten bits is readily available and a low price. A "Vref" indicates a reference power source voltage for the AD converter 31 and a full-scale value of an AD converting value. In the case of an AD converter contained in a MCU, the Vref is usually set to be equal to a power source voltage for the MCU. Shunt voltages $V_1$, $V_2$, and $V_3$ of the reference power source voltage Vref in a power source circuit 40 are expressed by the following equations (1), (2), and (3). $R_1$, $R_2$, $R_3$, $R_4$, Rref, and Rth indicate resistances in the power source circuit 40, respectively. $P_1$, $P_2$, and $P_3$ indicate the respective terminals in an analogue switch 50.

$$P_1: V_1 = R_2/(R_1+R_2) \times Vref \quad (1)$$

$$P_2: V_2 = R_3/(R_3+R_4) \times Vref \quad (2)$$

$$P_3: V_3 = Rth/(Rth+Rref) \times Vref \quad (3)$$

Here, $V_2 > V_3 > V_1$.

Error factors include an offset error in an operational amplifier (OP) 60 and a gain error (GE) in the operational amplifier 60. A ten bits AD converter contained in the MUC utilizes a sequential comparison system and is significantly subject to an error such as an AD offset error. AD converting values are indicated by $A_1$, $A_2$, and $A_3$, respectively, when the respective terminals $P_1$, $P_2$, and $P_3$ in the analogue switch 50 are switched. When an N indicates an amplification degree in the operational amplifier 60, the respective AD converting values for $V_1$, $V_2$, and $V_3$ are expressed by the following equations (4), (5), (6), and (7).

$$A_1 = V_1 + N \times GE \times OP \text{ offset error} + AD \text{ offset error} \quad (4)$$

$$A_2 = (OP \text{ offset error} + V_2 - V_1) \times N \times GE + AD \text{ offset error} \quad (5)$$

$$A_3 = (OP \text{ offset error} + V_3 - V_1) \times N \times GE + AD \text{ offset error} \quad (6)$$

$$A_2 - A_1 = (V_2 - V_1) \times N \times GE \quad (7)$$

Since the $V_1$, $V_2$, and N are known, the GE can be obtained by the following equation (8).

$$GE = (A_2 - A_1)/N(V_2 - V_1) \quad (8)$$

If an operation that reads AD converting values in the respective terminals P1 and P2 in the analogue switch 50 is designated by a circuit correction cycle, the cycle will be $A_3 - A_1 = (V_3 - V_1) \times N \times GE$. It is possible to eliminate the gain error (GE) of the operational amplifier (OP) 60 since the GE is obtained by the circuit correction cycle. On measuring a temperature, the MCU 30 can effect the correction cycle of the terminal P1 and P2, then measure the terminal P3, eliminate the error factors from the measured values, and obtain the thermistor temperature from a table stored in the MCU. This will be displayed on a display 70 as a body temperature.

The ear-type clinical thermometer of the present invention can be applied to an animal as well as a human being.

The entire disclosure of Japanese Patent Application No. 2005-071350 filed on Mar. 14, 2005 including the specification, claims, drawings and summary is incorporated herein by reference in its entirety.

While the present invention has been particularly described, in conjunction with a specific preferred embodiment, it is evident that many alternatives, modifications, and variations will be apparent to those skilled in the art in light of the foregoing description. It is therefore contemplated that the appended claims will embrace any such alternatives, modifications, and variations as falling within the true scope and spirit of the present invention.

Thus, having described the invention, what is claimed is:

1. An ear-type clinical thermometer including a probe comprising: a first heat insulation member made of a resin material; a second heat insulation member, the second heat insulation member being a better insulator than the first heat insulation member, the second heat insulation member being made of a resin material that is connected to a distal end of said first heat insulation member; a protection cover that sheathes said first heat insulation member and second heat insulation member; a thermistor fine lead wire embedded in said first heat insulation member and second heat insulation member; and a thermistor mounted substantially on a center of a turning end portion of said thermistor fine lead wire.

2. An ear-type clinical thermometer according to claim 1, wherein said second heat insulation member is tapered forwardly and is provided on the distal end with a concave surface, and wherein said turning end portion of said thermistor fine lead wire is bridged over said concave surface of said second heat insulation member to be exposed above said concave surface.

3. An ear-type clinical thermometer according to claim 2, wherein said concave surface of said second heat insulation member is a reflective surface.

4. An ear-type clinical thermometer according to claim 1, wherein a heat time constant of said thermistor is 1 second or lower.

5. An ear-type clinical thermometer according to claim 1, wherein a analogue switch having a plurality of terminals is provided at an output side of a power source circuit in a temperature measuring circuit and the analogue switch is a switch for correcting analogue to digital conversion errors.

6. An ear-type clinical thermometer according to claim 1, wherein a heat time constant of said thermistor is 0.1 second or lower.

* * * * *